March 9, 1926. 1,575,759
A. F. HAYNIE
CABLE CONNECTION
Filed July 7, 1925  2 Sheets-Sheet 1
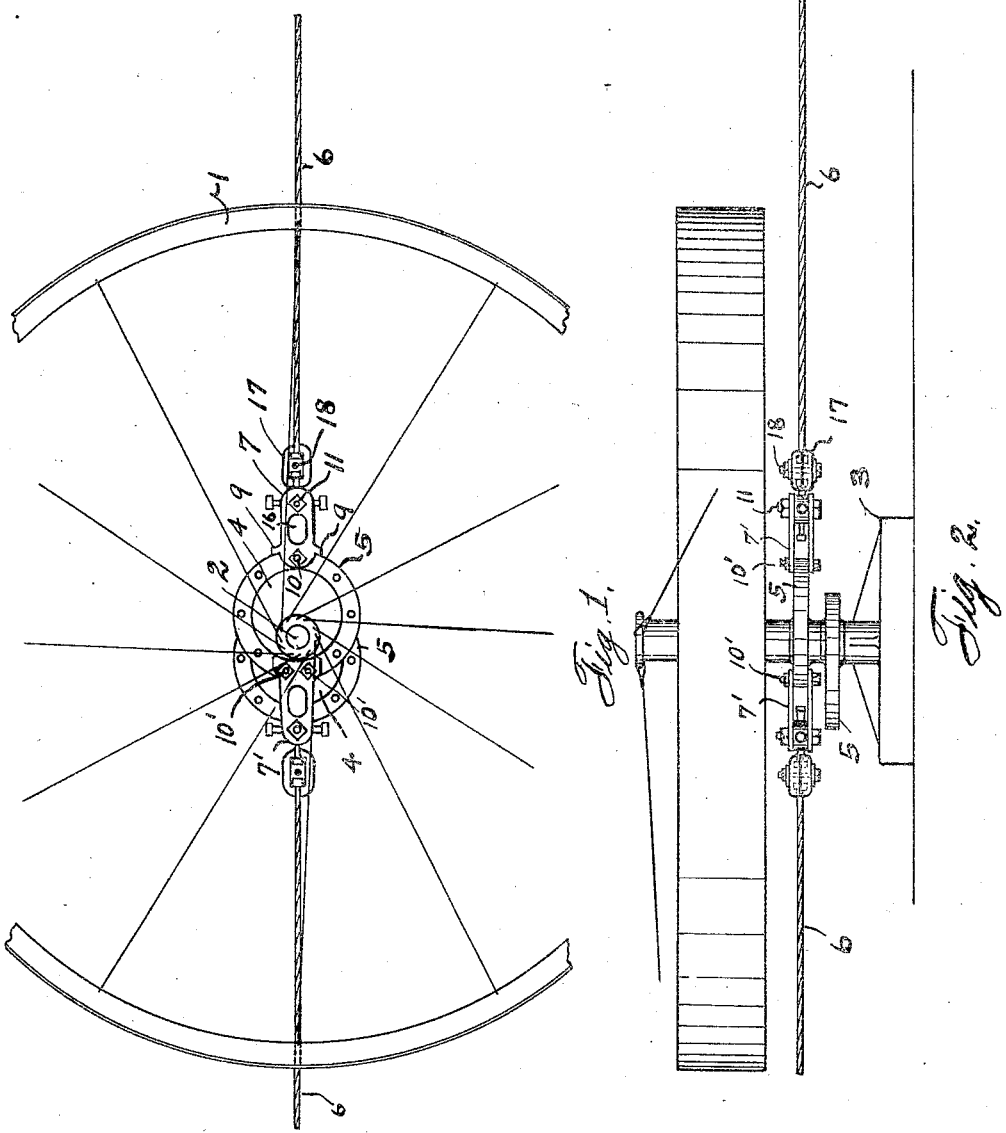

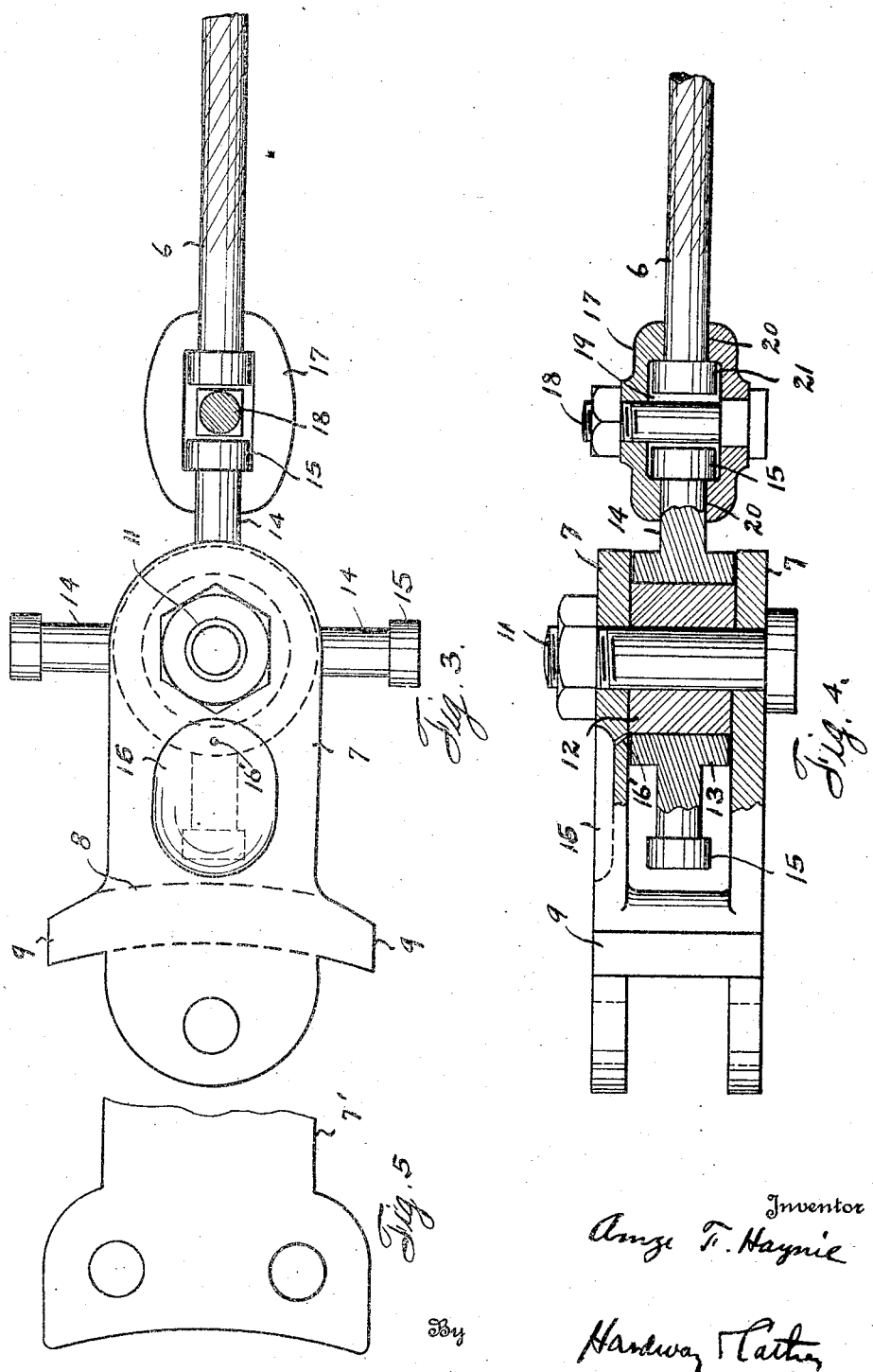

Patented Mar. 9, 1926.

1,575,759

UNITED STATES PATENT OFFICE.

AMZI F. HAYNIE, OF BATSON, TEXAS.

CABLE CONNECTION.

Application filed July 7, 1925. Serial No. 42,109.

*To all whom it may concern:*

Be it known that I, AMZI F. HAYNIE, a citizen of the United States, residing at Batson, in the county of Hardin and State of Texas, have invented certain new and useful Improvements in a Cable Connection, of which the following is a specification.

This invention relates to new and useful improvements in a cable connection.

One object of the invention is to provide a device of the character described specially designed for the purpose of connecting an operating cable to the eccentric ring of a power, or operating mechanism. The connection is specially adapted for use in mechanism employed for operating pump jacks which are used for operating pumps in oil fields.

Another object of the invention is to produce a connection of the character described which is of very simple and durable construction, and which may be readily adjusted so as to take up wear.

With the above and other objects in view this invention has particular relation to certain novel features of construction, operation and arrangement of parts, an example of which is given in this specification, and illustrated in the accompanying drawings, wherein:—

Figure 1 shows a plan view of the power, or pump operating mechanism.

Figure 2 shows a side view thereof.

Figure 3 shows an enlarged plan view of the cable connection.

Figure 4 shows a sectional view thereof, and

Figure 5 shows a fragmentary view of a slightly modified form of said connection.

Referring now more particularly to the drawings, wherein like numerals of reference designate similar parts in each of the figures, the numeral 1 designates a suitable power wheel, which is revolved, in a horizontal plane by means of a belt (not shown), said wheel being fixed on a vertical shaft 2 which is rotatable on the base 3. Beneath the power wheel 1, there are fixed, on the shaft 2, a pair of oppositely disposed eccentrics 4, 4 loosely surrounding which are the bands 5, 5. Cables, as 6 are connected to these bands and are also connected, in the usual way, to the pump jacks, in the field. As the eccentrics rotate the cables are operated to operate the pump jacks and pumps connected thereto.

A special form of cable connection has been provided for connecting the cables to the eccentric bands 5, which will now be described. There is a bracket formed with spaced jaws 7, 7, connected by an arcuate bridge 8, said bridge being extended each way beyond the bracket proper forming the abutments 9, 9. At one end of the bracket the jaws 7 embrace the band 5, with the concave side of the bridge 8 and abutments 9 lying against the periphery of the band 5, and a bolt 10 passes through said ends of the jaws 7 and the band to secure the connection to the band. The bridge 8 and abutments 9 will prevent the swinging of the bracket on the bolt 10 and thus will minimize the wear on the bolt and the bearing through said band 5 in which said bolt works.

The other ends of the jaws 7 have aligned bearings to receive the bearing bolt 11 which has a surrounding stationary bushing 12 thereon, between said jaws, and rotatably mounted on this bushing there is a hub 13 which has the radiating arms 14 which carry enlarged heads 15. The upper side of the bracket has a depression 16 provided to retain a lubricant and leading from this depression into the hub bearing there is a lubricant duct 16'.

The conventional clamp 17 is employed. This clamp is formed of upper and lower sections, clamped together by a clamp bolt 18. The clamp has an internal cavity 19 and end bearings 20, 20. The cable 6 has an enlarged head 21 thereon. The cable is fitted through one of the end bearings 20 with its head 21 lying in one end of the cavity 19 and one of the arms 14 is fitted through the other end bearing 20 with its head lying in the other end of the cavity 19 and a connection between the cable and band 5 is thus formed.

Should one of the arms 14 break one of the other arms may be connected to the clamp 17, in the manner stated and the break thus quickly repaired.

As the eccentrics rotate the corresponding hubs 13 will partly rotate back and forth, on the bushings 12, the sides of the bushings, and of the hub bearing toward the bands 5, taking the wear. When this wear permits the hub to have too much play the nut of the bolt 11 may be loosened and the bushing 12 may be given a half turn and the hub 13 also turned half way around and re-connected to the clamp 17 and the wear thus, in effect, be taken up.

In the form of bracket illustrated in Figure 5 the bridge 8 and abutments 9 are dispensed with and the jaws 7' are connected to the band 5 by means of two bolts 10' 10' which hold the bracket against any swinging movement relative to said band.

What I claim is:

1. A connection of the character described including a bracket formed with spaced jaws, a rotatable hub mounted between the jaws at one end, a radiating arm carried by said hub, said arm having an enlarged free end.

2. A connection of the character described including a bracket formed with spaced jaws, a rotatable hub mounted between the jaws at one end, a radiating arm carried by said hub, said arm having an enlarged, free end, the other ends of the jaws being formed for attachment to an actuating device.

3. A connection of the character described including a bracket formed with spaced jaws, a rotatable hub mounted between said jaws, radiating arms carried by said hub and having their free ends formed with enlarged heads.

4. A device for connecting a cable to an eccentric ring including a bracket adapted to be attached, at one end to said ring, a rotatable member mounted on said bracket, and an arm carried by said member.

5. A device for connecting a cable to an eccentric ring including a bracket adapted to be attached at one end, to said ring, a rotatable member mounted on said bracket, an arm carried by said member, the free end of said arm having an enlarged head.

6. A device for connecting a cable to an eccentric ring and including a bracket, one end of which is adapted to be connected to said ring, a rotatable member mounted on the bracket and a plurality of radiating arms carried by said member.

7. A device for connecting a cable to an eccentric ring and including a bracket, one end of which is adapted to be connected to said ring, a rotatable member mounted on the bracket and a plurality of radiating arms carried by said member, the free ends of said arms having enlarged heads.

8. A device of the character described including a bracket, one end of which is formed with lateral abutments, a rotatable member mounted on the other end of said bracket, and a radiating arm carried by said member.

9. A device of the character described including a bracket, one end of which is formed with lateral abutments, a rotatable member mounted on the other end of said bracket and a radiating arm carried by said member, the free end of said arm having an enlarged head.

10. A device of the character described including a bracket, a bearing pin carried thereby, a bushing fixed against rotation on said pin, a rotatable member mounted on the bushing, and radiating arms carried by said member.

11. A device of the character described including a bracket, a bearing pin carried thereby, a bushing fixed against rotation on said pin, a rotatable member mounted on the bushing and radiating arms carried by said bushing, said bracket having a depression for containing a lubricant with a duct leading from said depression to the bearing of said member.

12. A device of the character described including a bracket, a bearing pin carried thereby, a bushing fixed against rotation on said pin, a rotatable member mounted on the bushing and radiating arms carried by said bushing, the free ends of said arms having enlarged heads.

In testimony whereof I have signed my name to this specification.

AMZI F. HAYNIE.